Dec. 21, 1965  G. R. MULCAHY, JR., ET AL  3,224,714
MID-AIR PARACHUTE RELEASE DEVICE
Filed Dec. 3, 1963  7 Sheets-Sheet 1

INVENTORS
GEORGE R. MULCAHY JR.,
OTIS B. FERGUSON
BY
Wade Koonty
Ruth Cochran
ATTORNEYS Dec. 21, 1965    G. R. MULCAHY, JR., ET AL    3,224,714
MID-AIR PARACHUTE RELEASE DEVICE
Filed Dec. 3, 1963    7 Sheets-Sheet 2

INVENTORS
GEORGE R. MULCAHY Jr.,
OTIS B. FERGUSON
BY
ATTORNEYS

Dec. 21, 1965   G. R. MULCAHY, JR., ET AL   3,224,714
MID-AIR PARACHUTE RELEASE DEVICE
Filed Dec. 3, 1963   7 Sheets-Sheet 3

INVENTORS.
GEORGE R. MULCAHY Jr.,
OTIS  B.  FERGUSON
BY
ATTORNEYS

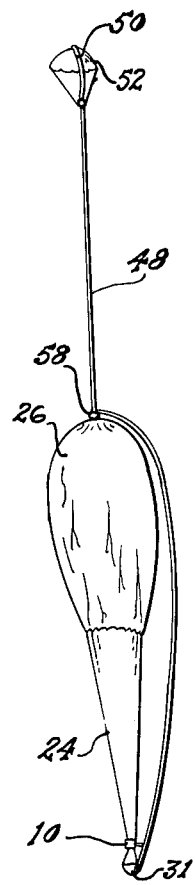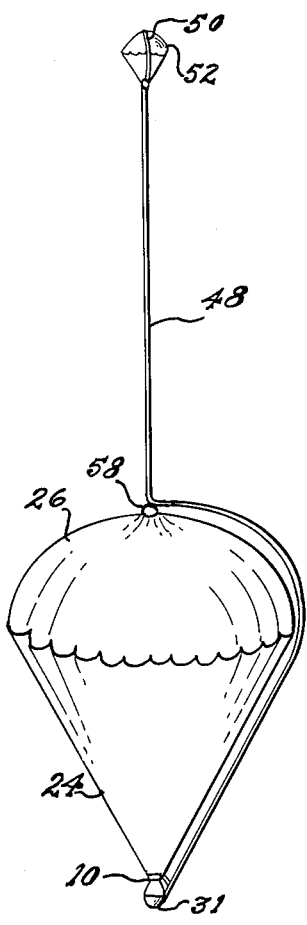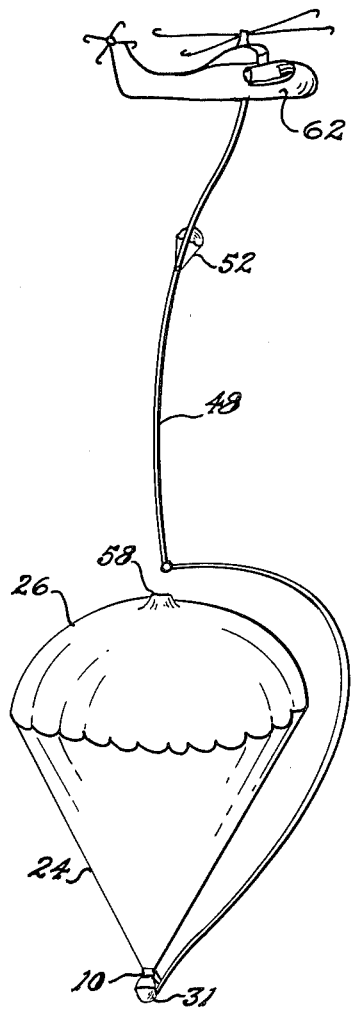

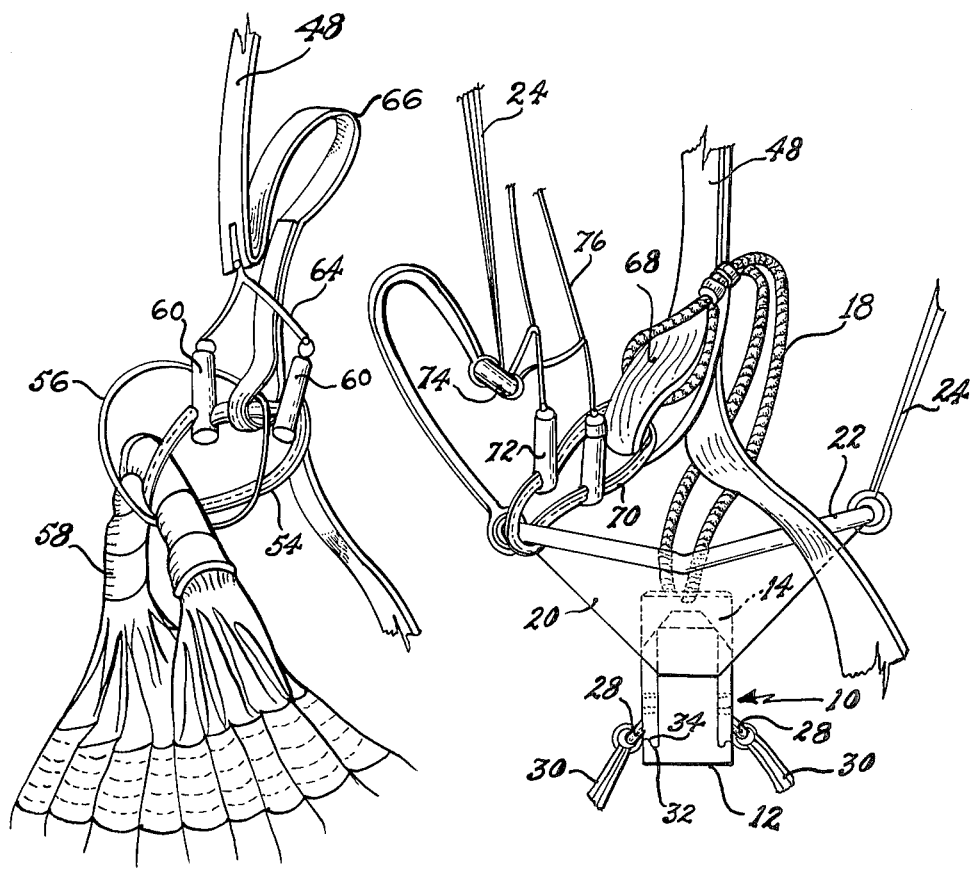

Dec. 21, 1965   G. R. MULCAHY, JR., ET AL   3,224,714
MID-AIR PARACHUTE RELEASE DEVICE
Filed Dec. 3, 1963   7 Sheets-Sheet 6
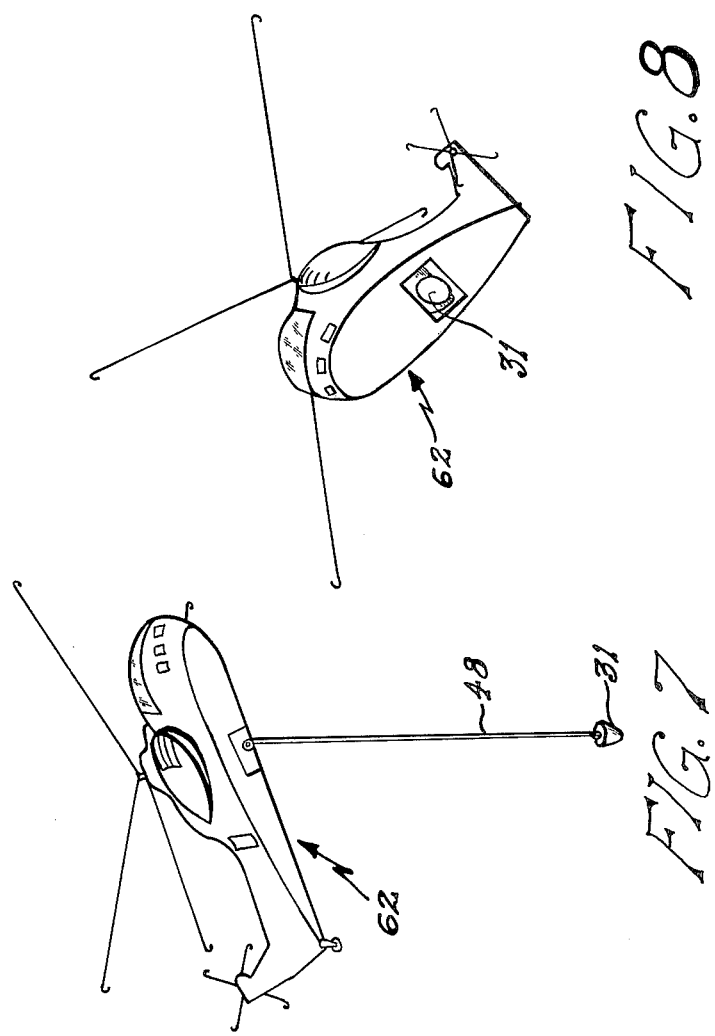
INVENTORS.
GEORGE R. MULCAHY JR.,
OTIS B. FERGUSON
BY
ATTORNEYS United States Patent Office 3,224,714
Patented Dec. 21, 1965

3,224,714
MID-AIR PARACHUTE RELEASE DEVICE
George R. Mulcahy, Jr., Box 154, La Luz, N. Mex., and Otis B. Ferguson, Circle "M" Trailer Park, Highway 70 W., Alamogordo, N. Mex.
Filed Dec. 3, 1963, Ser. No. 327,853
7 Claims. (Cl. 244—138)
(Granted under Title 35, U.S. Code (1952), sec. 266)

The invention described herein may be manufactured and used by or for the United States Government for governmental purposes without payment to us of any royalty thereon.

The present invention relates to mid-air parachute release devices and, more particularly, to a device for releasing pay-loads in mid-air from their supporting main parachutes when the payload is picked up in mid-air by a retrieving air or spacecraft in flight.

Extensive use is now being made of retrieving systems for mid-air retrieving of payloads previously released from air or space cargo craft. Great difficulties have been experienced in these maneuvers and much damage sustained when the main parachute system, supporting the payload in mid-air before retrieval, becomes a dangling and useless appendage, becoming entangled in the aircraft surfaces and controls, and interfering with the stowage of the load. It becomes, therefore, a great source of danger when the load is caught in mid-air, and parachute support is no longer needed.

The present invention has for its object the provision of a device for releasing the main parachute or cluster of parachutes from the load at the time the system is caught in mid-air so that the parachute system will be freed and jettisoned.

A further object of the invention is the provision of a ground probe for causing separation of the parachute from the payload in the event that the load is not caught in mid-air.

A further object of the invention is the provision of multiple safety measures for insuring the separation of the parachute from the load.

A further object of the invention is the provision of means whereby huge weights, requiring either a single large main parachute or a cluster of smaller parachutes, can be cut away quickly from their supporting parachutes either in mid-air upon retrieval or immediately before a ground landing, thus preventing dragging of the load after landing.

A further object of the invention is the provision of a device whereby payloads recovered in mid-air may be winched aboard the retrieving aircraft or spacecraft, or stored externally of said craft, unimpeded by an dangerous and dangling parachute.

A further object of the invention is the provision of a releasable device for attaching the parachute and load comprised of four sections only, thereby providing simplicity of design and operation and assuring reliability with the consequent elimination of hazards and uncertainties. The device is thus extremely strong, durable and reliable, and at the same time, compact in size and weight.

The invention constitutes a breakthrough in the art of mid-air payload retrieval.

In the operation of the device, payloads planned for delivery in a certain area are equipped with stowed parachutes. They are flown over the delivery area, and discharged from the aircraft in flight. This is useful for many sorts of maneuvers such as routine mail or other commodity delivery. Furthermore, in critical situations where hazards and time delays would be encountered by landing, the cargo craft is enabled to make delivery without landing and to leave the area quickly.

The free fall of the payload is interrupted by the deployment of first, a pilot or drogue parachute, equipped with a device capable of being engaged by a hook or other device carried on a line by a retrieving aircraft, and second, by a single main parachute or a parachute cluster. The drogue parachute is equipped with a drogue line which by-passes the main parachute and is secured to it only by frangible and otherwise releasable attachments, and attaches firmly, and for present purposes, permanently to the payload. As presently shown, the drogue line is attached to the apex of the main parachute by two break cord loops, slack being provided between the apex and a releasable block which intervenes between the shroud or suspension lines of the main parachute and the suspension lines of the payload. Shortly after inflation of the main parachute, time delay explosive cutters, initiated by the force exerted on the drogue line, sever the strongest break cord loop, leaving only the second break cord loop to hold the drogue line to the chute. As the retrieving aircraft hooks into the drogue chute, and takes up the slack in the drogue line, the second break cord breaks. The remaining slack in the drogue line is taken up. Force is exerted on a shear pin which holds the portions of the locking block together. Risers from the main parachute and risers from the load are attached to separating portions of the block. The payload is thus freed and is suspended freely from, and supported entirely by the retrieving aircraft. It may be winched upward by means provided in the retrieving craft, and either taken aboard or stowed externally of the craft.

These and other advantages, features and objects of the invention will become more apparent from the following description taken in connection with the illustrative embodiments in the accompanying drawings, wherein:

FIGURE 4a is a schematic view of the payload in mid-air after being discharged from the cargo plane, supported only by a pilot parachute and before the deployment of the main parachute;

FIGURE 4b shows the process at the moment of complete deployment of the main parachute and the beginning of the release of the drogue line at the apex of the main parachute;

FIGURE 4c shows the process at the moment when the pilot parachute has been engaged by the retrieving air or spacecraft;

FIGURE 5 is a detailed view of the double connection between the main parachute apex and the drogue line, one explosively operated and the other frangible, broken by force exerted on the drogue line at the time of retrieval;

FIGURE 6 is a detailed view of the connections of the release device to first, the payload risers, second, the drogue line and third, to the suspension lines of the main parachute, the last being an optional reinforcement;

FIGURE 7 is a schematic view of the payload freed, and in the process of being winched upward to the retrieving aircraft;

FIGURE 8 is a schematic view of the retrieved load, stowed externally against the lower portion of the aircraft.

Figure 1:
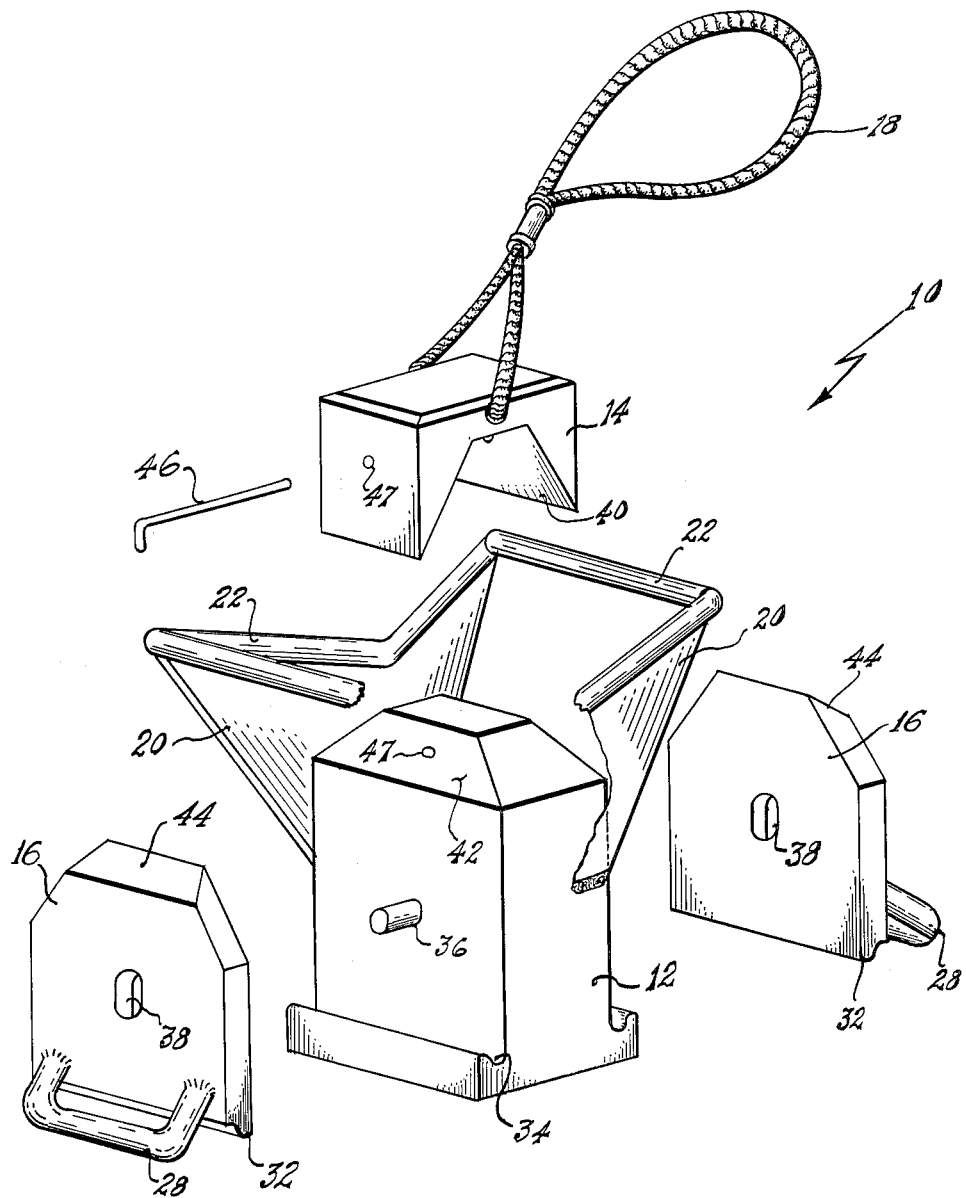
FIGURE 1 is a view of the four sections of the locking block of the instant invention.
Figure 2:
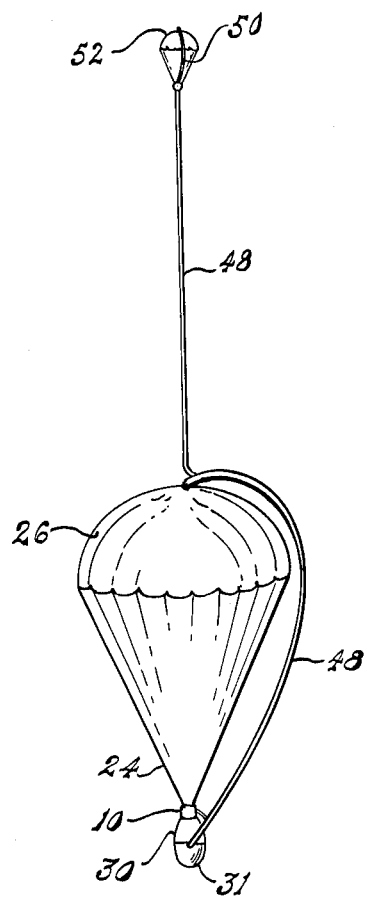
FIGURE 2 is a schematic view of a drogue or pilot parachute, a main parachute and the suspended payload, the whole system suspended and awaiting retrieval.

Referring more in detail to the drawings, four basic components make up the release device of the invention. The assembled device (see FIGURE 1) is designated by the numeral 10. It comprises a main body or block 12, a locking block 14 and two side elements 16. The locking block is provided with a pull cord 18. A pair of plates 20 are welded or otherwise secured to the body 12. They extend upward obliquely and provide support to a riser-connecting ring 22, to which the main parachute risers or suspension lines 24 of a main parachute 26 are attached. (See FIGURES 2 and 6.) The side elements 16 each carry a rod 28, or other expedient means for attachment of the payload risers 30, supporting the payload 31.

The main body 12 and the side elements 16 are provided with tongue and groove connection comprising the lip 32 and trough 34 which provide a fulcrum, both for the assembling and disconnection. Sidewise slipping is prevented by engagement of a pawl 36 on either element with a complementary opening 38, on the other. When the side elements have been placed, the locking block 14 is lowered and locks the separate portions of the release device.

Beveled faces 40 of the under portion of the locking block 14 are complementary to and fit with the beveled surfaces 42 on the main body 12 and additionally fit over beveled surfaces 44 on the upper portions of the side elements 16. A shear pin 46 is inserted through meshing openings 47 provided respectively in the upper portion of the main body 12 and the locking block 14. This secures the locking connection until sufficient shearing force is exerted on the locking block 14 to break the shear pin 46. When sufficient force is exerted to break the shear pin 46, the block 14, under stresses later described, will be lifted away. The side elements or plates 16, carrying the weight of the payload will be rotated outwardly and severed from the main block 12 to which the main parachute 26 is attached.

The block 14 is also secured to a drogue line 48 which is, for present purposes, permanently secured at its lower end to the payload 31. Its upper end is provided with a loop 50 forming part of a drogue or pilot parachute 52. At a selected point between its ends it is releasably secured to the apex of the main parachute 26 (see FIGURE 5) and to the release device pull cables (see FIGURE 6).

The stages in the deployment of the cutaway parachute system are depicted in FIGURES 4a, 4b and 4c. As the parachute 26 deploys, the system is falling very fast. Two break cords 54 and 56 frangibly secure the drogue line 48 to a loop 58 at the parachute apex. These ties prevent the drogue chute from breaking the shear pin 46 pulling the locking block free and releasing the main parachute prematurely, which would result in the unretarded fall of the load.

Upon complete inflation of the main parachute 26, the rate of descent is slowed to a point where the drogue chute drag is a negligible force in relation to the shear pin strength. Shortly after inflation of the main parachute 26, mechanically actuated explosive time delay cutters 60 sever the heavy break cord 54, which until now has born the brunt of the drogue chute drag force. The cutters are secured to the drogue line by cords 64 leaving a slack loop 66 in the drogue line. After the break cord 54 is cut the attachment of the drogue line to the main parachute apex, is maintained only by the second lighter break cord 56. As the retrieving air or space craft hooks into the drogue parachute, and takes up the slack in the drogue line, the light frangible cord 56 is broken. The drogue line force then tranfers to the release device.

The cable 18 secures the locking block to the drogue line 48. When sufficient force is generated to sever the shear pin 46, the locking block 14 is removed, the weight of the load 31 rotates the side elements outward and downward and the parachute is thus cutaway.

FIGURE 6 shows also an additional back up system or safety cushion which may be optionally used to prevent the premature operation of the release. It operates in the same manner as the explosive cutters 60 described above. The webbing loop 70 is routed through the drogue line loop 68, through the explosively operated time delay cutters 72, and around the parachute riser connecting ring 22. The pull cords 76, operating the time delay mechanism of the cutter 72, are tied off to the main parachute suspension lines 24 in such a manner as to initiate the cutters as tension is brought to them during deployment of the main parachute 26. (See ring 74.)

FIGURE 7 shows the relative towing position of a recovered object in relation to the aircraft, and FIGURE 8 shows the retrieved load 31 stowed externally of the retrieving craft 62.

Figure 9:
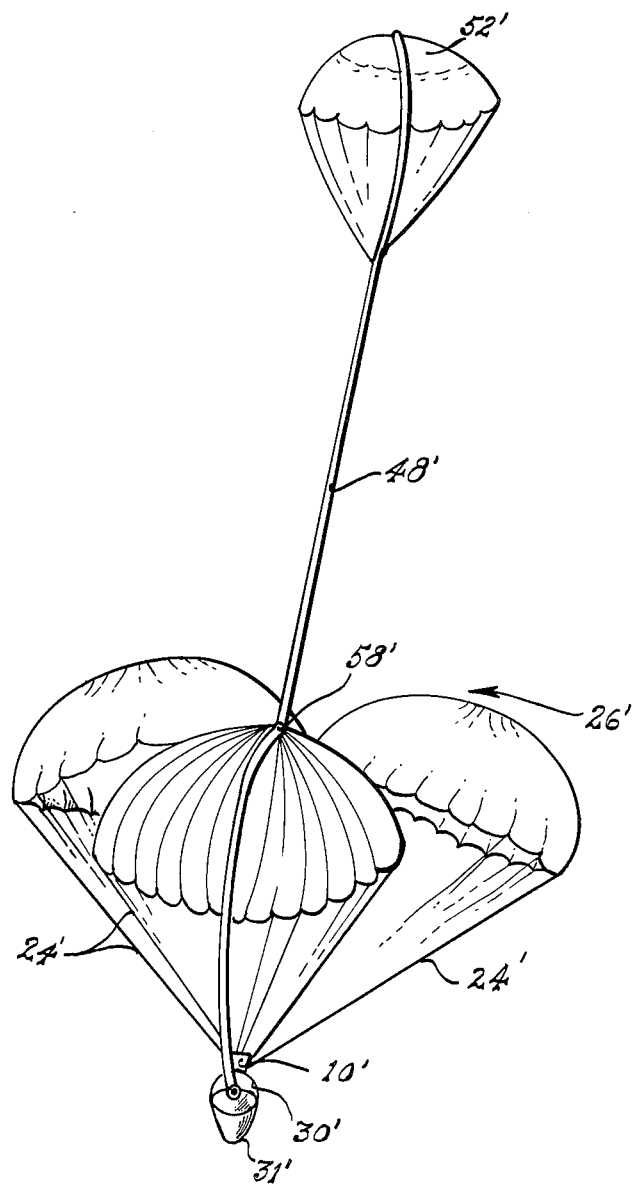
FIGURE 9 is a schematic view of the use of a parachute cluster for mid-air suspension of the load before retrieval.

In FIGURE 9 the mid-air suspension means for breaking the fall of the load 31' comprises a parachute cluster 26' and drogue parachute 52'. The drogue line 48' is freed from the parachute system at a central apex 58', and at a release device 10', constructed in the same manner as the device 10, shown in FIGURE 6 with its component parts and operating to sever the connection of the payload risers 31' by the disintegration of the block 10' as above described.

Figure 3:
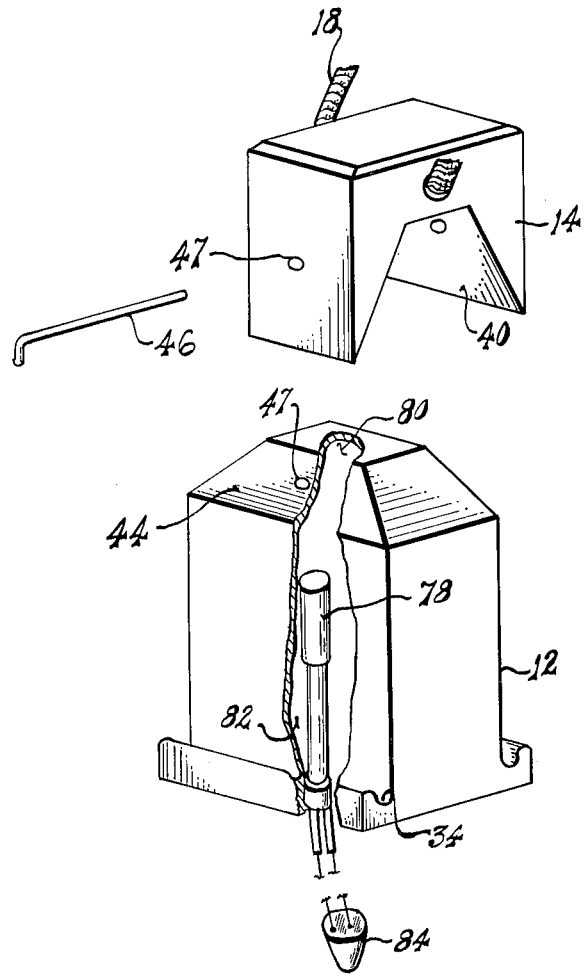
FIGURE 3 is a view of the central block with portions cut away to show the installation of an explosive device operable by ground probe contact.

An important feature of the invention is shown in FIGURE 3. This feature provides for the release of the parachute system from the load in the case where mid-air retrieval is not effected, and a ground landing of the load occurs. This is done by electrically exploding a squib 78 installed in a chamber 80 located within the main body 12. When the squib 78 is blown, the shear pin 46 is shattered and the locking block 14 is blown off. The wiring of the squib 78 is through a suitable protective channel 82 to a ground probe 84. The probe 84 triggers the ignition system of the squib 78 upon ground contact. The parachute system is jettisoned to prevent dragging and damage to the payload.

Although the invention has been described with reference to particular embodiments, it will be understood to those skilled in the art that the invention is capable of a variety of alternative embodiments within the spirit and scope of the appended claims.

We claim:

1. In a release device interposable between a first element and a second element for providing temporary attachment of said first and second elements, an assembly of severable components provided with interfitting complementary surfaces, said assembly comprising a solid main central body, surfaces beveled inwardly on the upper portion of said main body, side elements, a horizontally oriented groove on said body, a horizontally oriented tongue on the lower portion of each of said side elements to form a severable tongue and groove connection between said side elements and said main body, beveled surfaces on the upper portion of each of said side elements so arranged as to be a downward continuation of the beveled surfaces on said main body when said tongue and said groove are in operative connecting relationship, a solid locking block having internally beveled surfaces adapted to fit the continuous downwardly beveled surfaces of said main central body and said side elements to secure said main body and said side elements together in united relationship, connecting means on said locking block for connection with said first element, means on said side elements for connection with said second element, and means for severing said locking block from said components, whereby said first and second elements are released from each other, said means being operable by a severing force of predetermined magnitude.

2. A system for air-borne delivery and air-borne retrieval of payload by cargo aircraft and retrieving aircraft, respectively, said system comprising a payload, risers on said payload, a jettisonable main parachute having suspension lines for suspending said payload in mid-air after its delivery from said cargo aircraft, a drogue parachute, a drogue line attached to said drogue parachute, loop means on the upper portion of said drogue line adapted to be engaged by a retrieving aircraft, said drogue line being attached at its lower end to said payload, releasable means for attaching the drogue line to the apex of said main parachute, releasable means for attaching said drogue line to the suspension lines of said main parachute, said last-named means comprising an assembly of severable components and a locking block for temporarily securing said severable components together in united relationship, means for attaching some of said severable components to the risers of said payload, means for attaching said drogue line to said locking block, both of said releasable means being operable to release and jettison said main parachute by tension brought to said drogue line when said drogue line has been engaged by the retrieving craft.

3. A system for air-borne delivery of payload by cargo craft and its retrieval by retrieval aircraft, said system comprising a payload newly discharged from a cargo craft, payload risers on said payload, a pilot parachute, a drogue line permanently attached to said payload and to said pilot parachute, means on the upper end of said drogue line adapted to be engaged by a retrieving aircraft, a parachute system having suspension lines, said system being deployable for holding said payload temporarily suspended in mid-air after discharge from said cargo craft and before retrieval thereof, severable means for attaching the lower extremities of the suspension lines of said parachute system to said payload risers, said last-named means comprising an assembly of severable components and a locking block for securing said severable components together in united relationship, said locking block being secured to said drogue line and some of said severable components being attached to said payload risers, said severable components being freed from said locking block when tension is placed on said drogue line during the retrieval operation.

4. A release device, interposable between a payload and its suspending parachute system for separating said parachute system from said payload, said device comprising a main body, side elements, a locking block for holding said side elements and said main body locked together, means on each of said side elements for attachment of the risers of a payload, means on said main body adapted for attaching suspension lines of a parachute system to said main body, timed means explosively operated by tension placed on said suspension lines during deployment of said parachute system for severing the attachment of said suspension lines and said main body from said locking block, whereby said side elements are separated from said main body and separation of said parachute and payload is effected.

5. A device for separating a payload in mid-air from its supporting parachute system during air retrieval of said load, said device comprising a drogue line engageable at its upper end by a retrieving aircraft, and attached at its lower end to said payload, frangible means, broken by stress on said drogue line during the retrieval operation, for attaching said drogue line to the apex of said parachute system, releasable means for attaching said drogue line to the lower extremities of the suspension lines of said parachute system, said frangible means and said releasable means being operated by tension on said drogue line during the retrieval operation for freeing said payload from said parachute system, said releasable means comprises a main body, means on said main body for attaching the lower portions of the suspension lines of said main parachute, side elements, means on said side elements for attachment of the payload risers, a locking block for holding the side elements securely in contact with said main body, means for securing said locking block to said drogue line, and means for removing said block to allow separation of said main body and said side elements and jettison said parachute system, said means being operated by tension on said drogue line during the retrieval operation.

6. A system for air retrieval of payloads delivered by cargo craft, said system comprising a payload, a main parachute having suspension lines for breaking the free fall of said payload, a drogue parachute adapted for suspension above said main parachute a drogue line attached at its upper end to said drogue parachute and provided with means engageable by a retrieving aircraft, said drogue line being attached at its lower end to said payload, a frangible attachment of said drogue line to the apex of said main parachute, a releasable locking means for securing the suspension lines of said main parachute to said payload, said last-named means comprising an assembly of severable components and a locking block for securing said severable components together in united relationship, means for releasing said locking means to jettison said main parachute, operable by tension on said drogue line during the retrieval operation, and a ground probe, said locking means being operable also by said ground probe in the event of failure of said retrieval operation.

7. A device for separating a payload having risers from a main parachute having suspension lines during air retrieval of said payload, said device comprising: a first element attached to said payload risers, a second element attached to said parachute suspension lines, a locking block for locking said first and second elements together, means maintaining said locking block in place, a line attached to said payload, means on said line for providing contact with a retrieving aircraft, means for removing said locking block, said last-named means operable by tension on said line during retrieval operations, back up safety means for preventing the premature withdrawal of said locking block, said means comprising a webbing loop securing said second element to said line, time delay explosively operated cutters on said webbing loop, said time delay cutters being initiated by tension brought on the suspension lines of said parachute during the retrieval operation.

References Cited by the Examiner
UNITED STATES PATENTS

| | | | |
|---|---|---|---|
| 2,662,707 | 12/1953 | Vann | 244—138 |
| 2,665,128 | 1/1954 | Guffey | 280—451 X |
| 2,942,815 | 6/1960 | Gross et al. | 244—137 |
| 3,137,465 | 6/1964 | Mulcahy | 244—142 |

MILTON BUCHLER, *Primary Examiner.*

FERGUS S. MIDDLETON, *Examiner.*

A. E. CORRIGAN, *Assistant Examiner.*